United States Patent Office

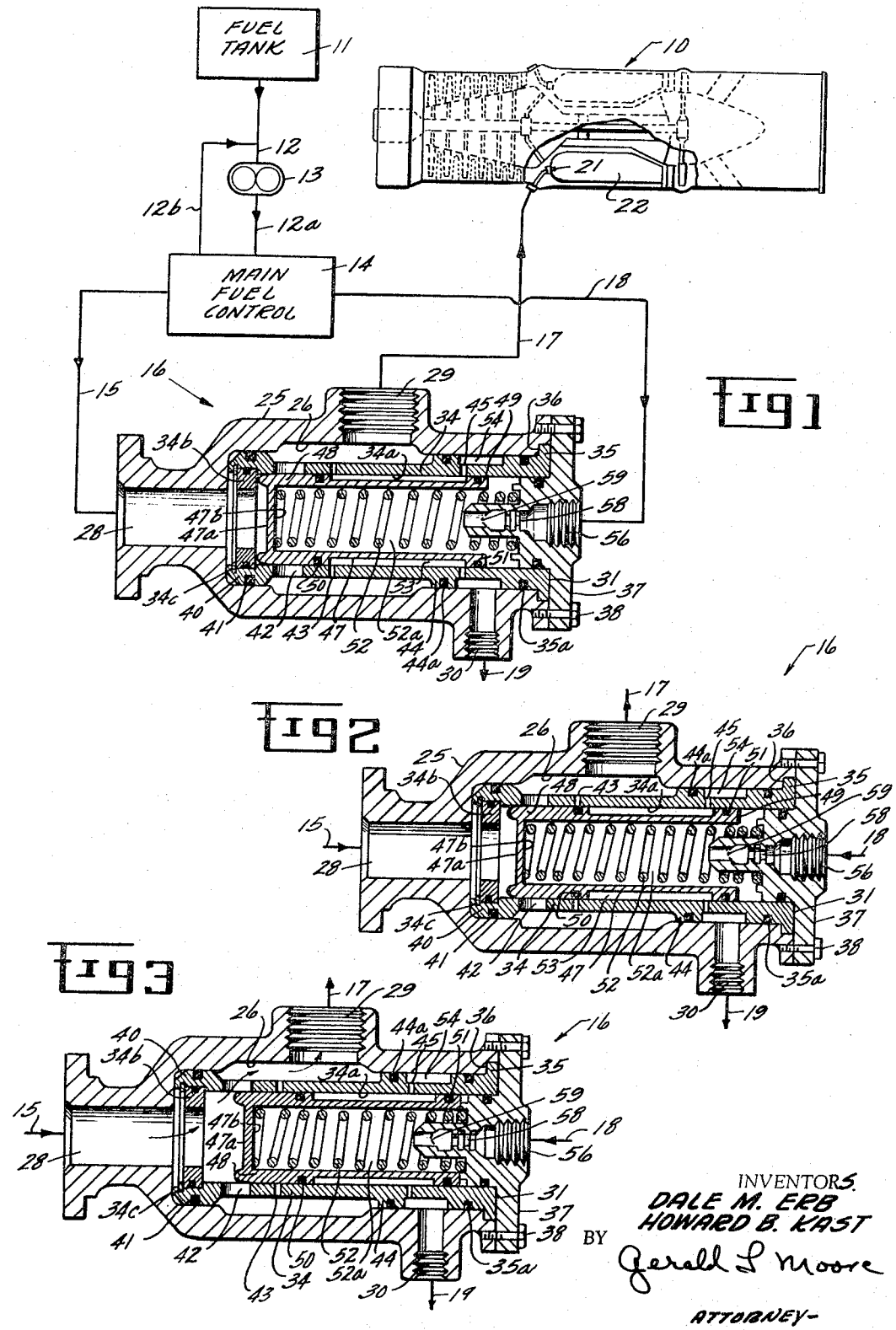

3,339,574
Patented Sept. 5, 1967

1

3,339,574
PRESSURIZING AND DRAIN VALVE
Dale M. Erb, Cincinnati, and Howard B. Kast, Fairfield, Ohio, assignors to General Electric Company, a corporation of New York
Filed May 29, 1964, Ser. No. 371,228
5 Claims. (Cl. 137—102)

This invention relates to thermal powerplant fuel systems and more particularly, to a fuel system pressurizing and drain valve to be utilized with aircraft gas turbine engines.

In the operation of present day turbojet aircraft, an ever present problem exists in the drainage of unburned fuel from the fuel injecting means upon engine shutdown. At the time of shut-down fuel collects in the combustion chambers as it drains from the fuel lines leading from the fuel source such that in the case of a restart, it may burn immediately to cause an over temperature condition within the combustion chamber. Such an over temperature condition may result in damage to the turbojet and it is therefore advantageous to drain such fuel from the engine at shut-down. Additionally, it is necessary to maintain a minimum back pressure in the fuel system at the fuel metering valve since the control utilizes metering orifices to control the fuel flow to the fuel injecting means in the engine combustor and various servo systems are operated by the fuel pressure system.

To accomplish the draining of excess fuel and the pressurizing of the fuel metering valve, there is commonly provided a pressurizing and drain valve in the fuel system between the metering valve and the fuel injecting means. Such valves must serve this dual function and provide reliable operation, and previous valves have been quite complicated and expensive. Additionally, problems have been encountered in providing satisfactory dynamic seals for the valves and, since fuel from the fuel injection means is drained back through the valve, the valves frequently must withstand the drain flow of contaminated fuel since the fuel system in the combustor region is subjected to higher temperatures which can result in the coking of fuel in the system. All of these factors multiply the problems of providing a reliable and uncomplicated pressurizing and drain system.

It is therefore the object of this invention to provide an improved pressurizing and drain valve for an engine fuel system.

Other objects and many of the attendant advantages of this invention will be readily appreciated as the same becomes better understood by reference to the following detailed description when considered in connection with the accompanying drawings wherein:

FIG. 1 illustrates the fuel supply pressurizing and drain system with the pressurizing and drain valve in the fuel flow closed and drain open position;

FIG. 2 is a cross-sectional view of the valve illustrated in the flow closed and drain closed position; and FIG. 3 is a cross-sectional view of the valve in the flow open and drain closed position.

Referring now to the drawing therein is illustrated a turbojet engine 10 with the fuel system illustrated schematically comprising a fuel tank 11 with a fuel line 12 leading to the fuel pump 13. This pump supplies fuel under pressure to the main fuel control 14 through the fuel line 12a with the fuel control having a pump bypass line 12b leading back to the pump inlet. From the fuel control 14 which controls the quantity of fuel flow, fuel is supplied through the line 15 to the pressurizing and drain valve 16 and from there to the turbojet engine 10 through the fuel line 17. Additionally fuel line 18 leads from the main fuel control 14 to the valve 16 to supply reference pressure to the valve the purpose of which will

2 be explained later. Also leading from valve 16 is an overboard drain 19 which drains fuel from the engine and fuel line 17 after the engine is shut down.

The fuel supply to the turbojet 10 is fed through the fuel nozzles 21 in the combustor 22 where the proper fuel air mixture is provided for combustion in the normal manner. As mentioned heretofore when the engine is shut down, a valve in the main fuel control 14 shuts off the supply of fuel through the fuel line 15 and burning within the combustor 22 ceases. However, after shut-down some fuel remains in the fuel lines which when the turbojet is restarted can result in over heating the turbojet with resulting damage to the turbojet structure since this fuel will burn immediately upon re-initiation of combustion in the engine. The over heating results from the fuel pooling within the combustor in draining from the fuel system after shut-down, which when ignited, will quickly burn with the heating concentrated in a localized area where the fuel has collected. The pressurizing and drain valve 16 is provided to prevent this occurrence and in addition, provide a sufficient operating pressure within the fuel system for proper functioning of the main fuel control 14 and related servo systems which demand a minimum operating pressure for proper functioning.

Referring now to the pressurizing and drain valve 16, the valve comprises a housing 25 in which is formed an internal valve cavity 26 which is machined within the cavity in fluid flow relationship with a fluid inlet port 28, a flud outlet port 29, a drain outlet port 30 and a housing opening 31. Positioned within the valve cavity 26 is a sleeve member 34 which is maintained in place by having a flange 35 fitting in the recess 36 of the housing and held in place by an end plate 37 which is held by bolts 38 in the housing opening 31 with a seal 35a sealing between the flange and valve housing.

This sleeve 34 comprises a land 40 in which is positioned a static seal 41 forming a fluid tight juncture with the valve cavity wall and further includes a plurality of fluid ports 42, a plurality of smaller fluid ports 43, a land 44 having a seal 44a and a plurality of fluid ports 45, the function of which will be explained later. The sleeve is generally cylindrical shaped and is formed for insertion into the valve cavity through the housing opening 31. By use of an insert sleeve of this type a plurality of machining operations in forming the internal ports and sealing junctures may be performed on the sleeve before insertion into the valve thereby making manufacture of the valve simpler.

The sleeve forms the internal cylindrical cavity 34a in which is positioned a valve member 47 having a pair of lands 48 and 49 in which are positioned seals 50 and 51 forming fluid tight junctures between the valve member and the sleeve member 34. These lands 48 and 49 together with the valve member 47 forms an annular passage 53 with the sleeve 34, while the land 44 and flange 35 form an annular passage 54 with the sleeve member. The valve member is spring biased by spring 52 in a spring cavity 52a in the valve member to rest in the position shown in FIG. 1 against the ring member 34b of the sleeve member 34 which is in turn held in place by a spring washer 34c, the valve member includes a face 47a exposed to fluid entering the fluid inlet port 28.

The valve as illustrated in FIG. 1 is in the flow closed and drain open position where the valve member 47 is positioned to prevent flow from the fuel line 15 to the fuel line 17 while allowing drain flow from the fuel line 17 through the port 29, the ports 43, the annular passage 53, ports 45 and the annular passage 54 and the drain discharge port 30 to the drain line 19.

It is essential that the valve member 47 remain in this position so long as no fuel is to be supplied to the combustor 22 since this allows for such drainage of excess fuel from the fuel line 17 to prevent overheating of the turbojet on restarting as previously described. However, another function of the valve is to provide a pressurization of the fuel line 15 into the main fuel control to maintain within specified limits the pressure within the fuel system at the fuel control 14. To maintain the proper pressure a reference pressure must be supplied to the valve so that fluctuations in the pressure of the fluid within the fuel line 12 supplying fuel to the main fuel control will not materially effect this pressure drop. Therefore a reference pressure through the fuel line 18 is supplied through the port 56 formed in the end plate 37 at the housing opening 31 with the port 56 in fluid flow relationship with the spring cavity 52a in the valve member 47. Pressure passing from the fuel line 18 into this internal pressure or spring cavity 52a passes through the port 56 and adjoining damping orifices 58 and a screen 59, with the screens provided to prevent contaminated fuel from entering the valve, and the damping orifices prevent violent motions of the valve 47 by restricting fluid flow from the cavity 52a to the line 18 and vice versa.

In operation, in order for fuel to flow to the combustor 22 it must pass from the fuel line 15 through the valve and out through the line 17. To pass through the valve it must pass through the fluid port 28 into the sleeve 34 and past the valve member 47 through the ports 42 formed in the sleeve to thereafter pass through the fluid port 29 to the fuel line 17. In order for fuel to pass through the ports 42 the valve 47 must be moved to the right to uncover these ports in the sleeve 34. FIG. 2 illustrates the second position of the valve in the drain closed and flow closed position. In this position no fluid flow is permitted from the fuel line 17 to the drain line 19 and no flow is allowed from the fuel line 15 to the fuel line 17. In order for the valve 47 to move this increment to the right the pressure from the fuel line 15 must increase until the force on the face 47a of the valve 47 exposed to the fluid pressure of fuel line 15 exceeds the combined force of the spring 52 and the fluid pressure on face 47b of the valve which results from fluid entering from fuel line 18 into the cavity 52a. In this position the land 48 on the valve member 47 has moved to the right sufficiently to cover the ports 43 thereby preventing fuel flow from the fuel line 17 through the port 29 and into the cavity 53 thereby resulting in a drain closed position of the valve. However, even though the drain ports have been closed, the valve member has not moved sufficiently to uncover the ports 42 in the sleeve 34 to allow flow from the fluid inlet 28 to the fluid outlet 29, therefore the valve is still in the flow closed position. When the valve 47 unseats from the ring 34b, the area of the valve face 47a that is exposed to the fluid pressure from line 15 increases to cause the valve to move more quickly as it passes the ports 43 to open the ports 42. This permits positive action of the valve.

Referring now to FIG. 3 the pressure within the line 15 from the main fuel control has increased as would normally occur when the engine is started with a resulting pressure increase on the valve member face 47a to overcome the forces of the spring 52 and the fluid pressure within the cavity 52a pressing on face 47b to cause the valve member to move to the right until the land 49 on the valve has contacted the end plate 37 to stop movement of the valve member. While in this position flow may pass from the fuel line 15 through the port 28, through the openings 42 in the sleeve and out through the port 29 to the fuel line 17 as shown by the arrows. The valve will remain in this position until the pressure from the line 15 in the port 28 drops below a predetermined minimum at which time the force on face 47a on valve member 47 will reduce until the valve member will be caused to move to the left under pressure of the spring 52 and fluid within the cavity 52a. In this manner the valve maintains a minimum pressure within the fuel line 15 for proper operation of the main fuel control 14. With a complete pressure drop within the line 15, the valve member 47 will move to the left to the position illustrated in FIG. 1 at which time the drain ports will again be open for drainage of fuel from the fuel line 17. However, at no time is there flow from the port 28 to the port 29 when the drain ports are open since the valve member 47 must move past the openings 43 in the sleeve member 34 prior to the ports 42 in the sleeve member being opened.

While particular embodiments of the invention have been illustrated and described, it will be obvious to those skilled in the art the various changes and modifications may be made without departing from the invention and it is intended to cover in the appended claims all such changes and modifications that come within the true spirit and scope of the invention.

What is claimed as new and desired to be secured by Letters Patent of the United States is:

1. A pressurizing and drain valve for use in a fluid supply system comprising a pressurized fluid source for supplying fluid to a manifold or the like, and a reference pressure source, said valve comprising:
   a housing,
   a valve element shiftable therein,
   said valve element and housing forming in combination opposed chambers,
   a port for connecting one of said chambers to said reference pressure source to thereby urge said element to a first position,
   an intake for connecting the other of said chambers to said pressurized fluid source whereby when the pressure force on said element in the second chamber is greater than in the first chamber, the valve element will be shifted from said first position,
   a pressurized fluid outlet, opening into said second chamber for flow of fluid to said manifold,
   a drain outlet,
   internal passageway means between said outlets,
   said element blocking flow of fluid to said fluid outlet and permitting fluid flow from said fluid outlet to said drain outlet when in its first position,
   said element, when displaced from said first position a given distance, permitting flow of fluid to said fluid outlet, said element when displaced beyond a lesser given distance preventing flow of fluid between said outlets,
   whereby the pressure of the fluid source may be regulated when there is fluid flow and the manifold automatically drained when there is no fluid flow.

2. A pressurizing and drain valve as in claim 1 wherein,
   the housing has a bore therein,
   said valve element is in the form of a piston slideable in said bore,
   the pressurizing port and fluid intake respectively communicate with the opposed chambers formed at opposite ends of said piston,
   the fluid outlet opens into said bore intermediate the fluid inlet and the reference pressure port.

3. A pressurizing and drain valve as in claim 2 wherein,
   the internal passageway means between said outlets comprise an annular groove formed in said piston and at least one opening in said housing between said fluid outlet and said bore,
   said annular groove registering with said opening when said piston is in its first position and shifted out of register therewith when said piston is displaced beyond said lesser given distance to thereby prevent flow of fluid between said outlets.

4. A pressurizing and drain valve as in claim 2 wherein,
   the housing is compositely formed and comprises a sleeve, the inner surface of which provides the bore for said piston, said passageway means comprise openings through said sleeve spaced along its length and respectively connecting with said fuel discharge and said drain discharge, and a groove in said piston which connects said spaced openings only in said first piston position.

5. A pressurizing and drain valve as in claim 4 wherein, spring means are provided for urgingly yielding said piston towards said first position, and a damping orifice is provided in the connection of said reference pressure source to said one chamber.

References Cited

UNITED STATES PATENTS

| | | | |
|---|---|---|---|
| 2,500,555 | 3/1950 | Majneri | 137—102 |
| 2,837,148 | 6/1958 | Jay | 158—36 |
| 2,929,394 | 3/1960 | Wenner | 137—107 |

WILLIAM F. O'DEA, *Primary Examiner.*

H. COHN, *Assistant Examiner.*